United States Patent
Lubow

(10) Patent No.: US 7,370,799 B2
(45) Date of Patent: May 13, 2008

(54) SYSTEM AND METHOD FOR PRINTING IMAGES OF MACHINE READABLE SYMBOLS ON A PLURALITY OF SUBSTRATES

(75) Inventor: Allen Lubow, Brooklyn, NY (US)

(73) Assignee: International Barcode Corporation, New York, NY (US)

( * ) Notice: Subject to any disclaimer, the term of this patent is extended or adjusted under 35 U.S.C. 154(b) by 528 days.

(21) Appl. No.: 10/991,960

(22) Filed: Nov. 17, 2004

(65) Prior Publication Data

US 2005/0219635 A1   Oct. 6, 2005

Related U.S. Application Data

(60) Provisional application No. 60/520,821, filed on Nov. 17, 2003, provisional application No. 60/520,742, filed on Nov. 17, 2003.

(51) Int. Cl.
*G06K 5/04* (2006.01)
*G06K 7/10* (2006.01)
*G06K 9/32* (2006.01)

(52) U.S. Cl. .......................... 235/462.08; 235/462.09; 235/462.1

(58) Field of Classification Search ........... 235/462.08, 235/462.07, 462.1, 375, 462.09, 494, 454
See application file for complete search history.

(56) References Cited

U.S. PATENT DOCUMENTS

| | | | |
|---|---|---|---|
| 4,818,850 A | | 4/1989 | Gombrich |
| 5,521,709 A | | 5/1996 | Bossen et al. |
| 5,619,416 A | * | 4/1997 | Kosarew ............... 700/225 |
| 6,533,180 B1 | | 3/2003 | Wood |
| 6,722,563 B1 | | 4/2004 | Johnson |
| 2003/0080191 A1 | * | 5/2003 | Lubow et al. ....... 235/462.01 |
| 2004/0246529 A1 | * | 12/2004 | Pruden et al. ......... 358/3.28 |
| 2006/0060657 A1 | * | 3/2006 | Choong et al. ......... 235/492 |
| 2006/0175401 A1 | * | 8/2006 | Roberts ................... 235/383 |

OTHER PUBLICATIONS

International Search Report mailed Sep. 28, 2006 in corresponding International Application PCT/US2004/038723.
Written Opinion mail Sep. 28, 2006 in corresponding International Application PCT/US2004/038723.

* cited by examiner

*Primary Examiner*—Thien M. Le
*Assistant Examiner*—Edwyn Labaze
(74) *Attorney, Agent, or Firm*—Davidson Berquist Jackson & Gowdey LLP

(57) ABSTRACT

A method is provided for printing a plurality of images of a symbol that includes at least a two-dimensional machine readable symbol on a plurality of substrates or on a plurality of portions of a substrate so that the printable area of each substrate or substrate portion includes a complete representation of the two-dimensional machine readable symbol.

27 Claims, 9 Drawing Sheets

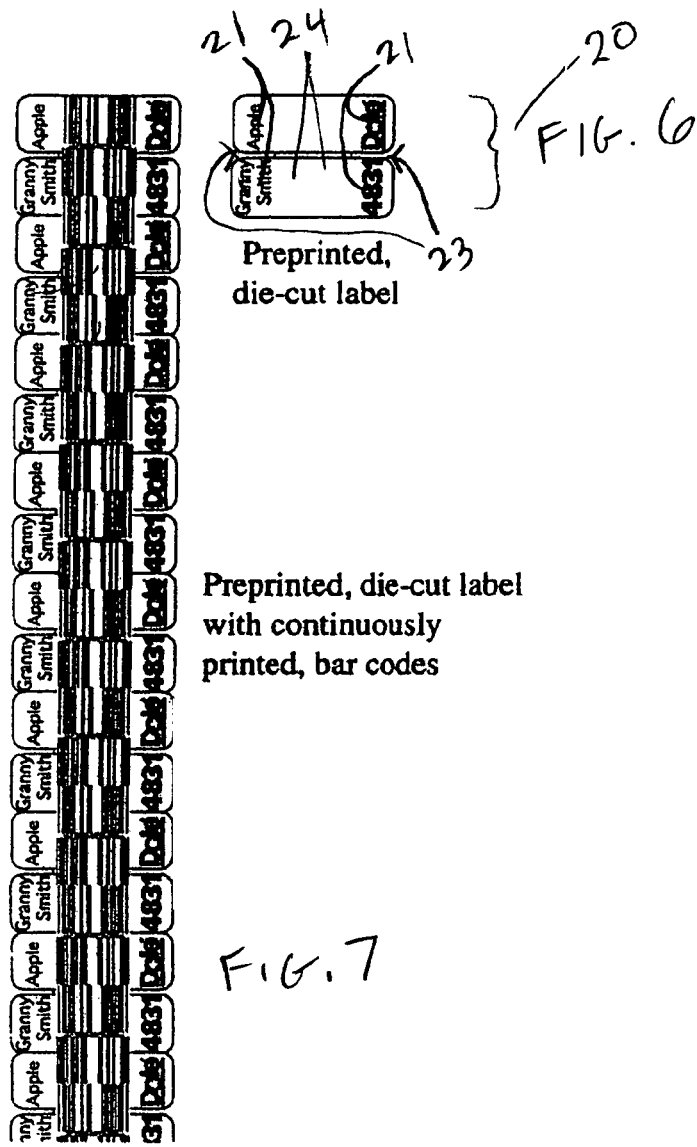
Preprinted, die-cut label
Preprinted, die-cut label with continuously printed, bar codes
FIG. 7
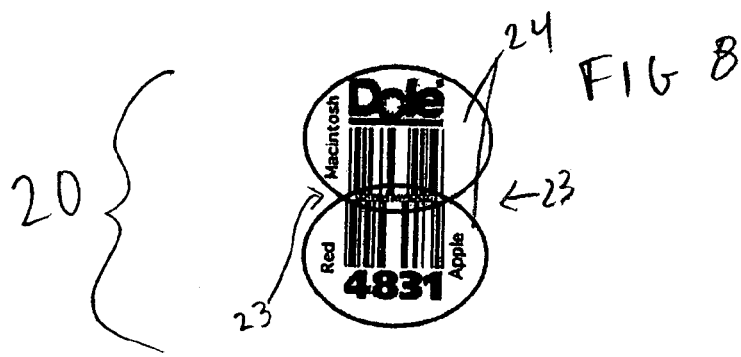

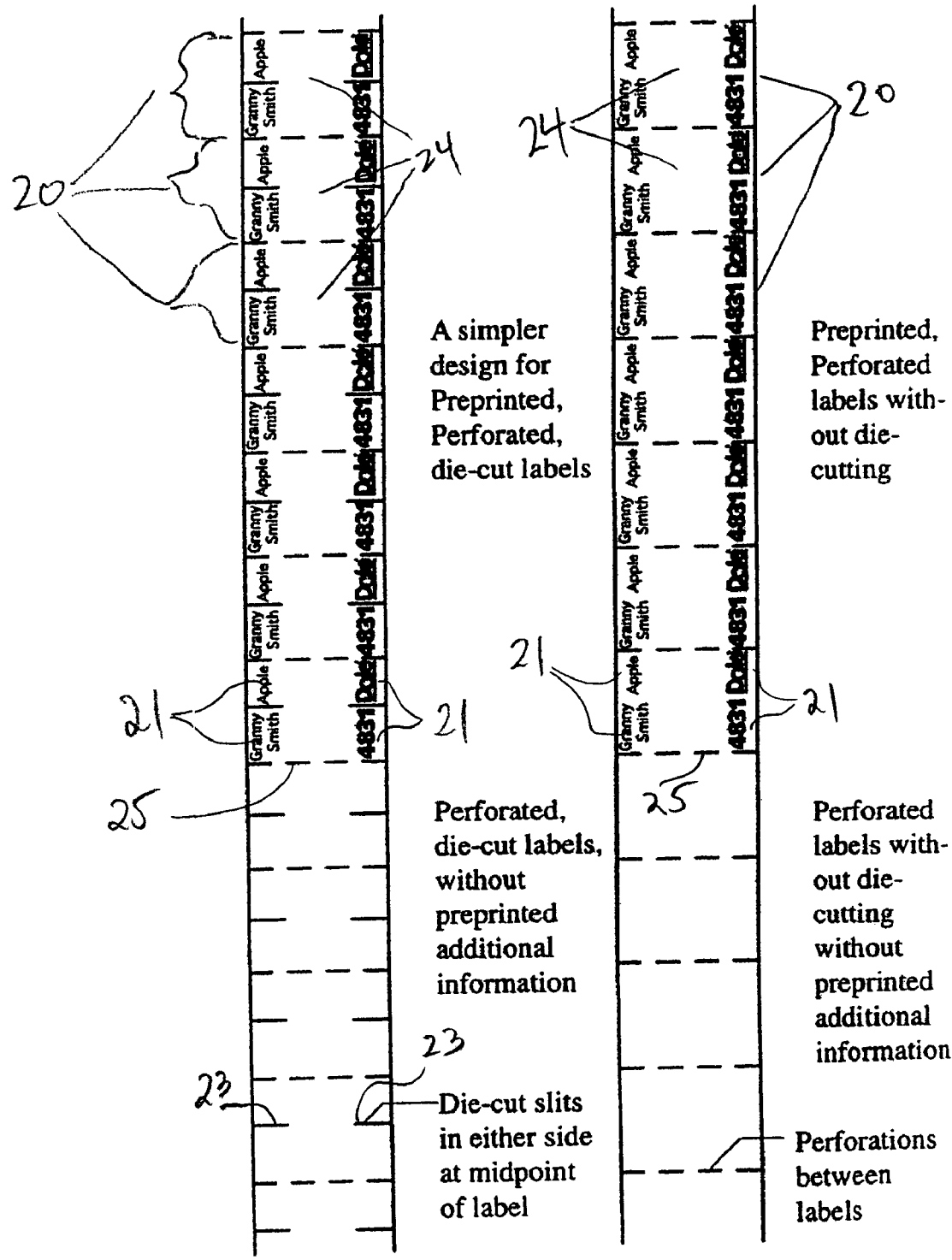

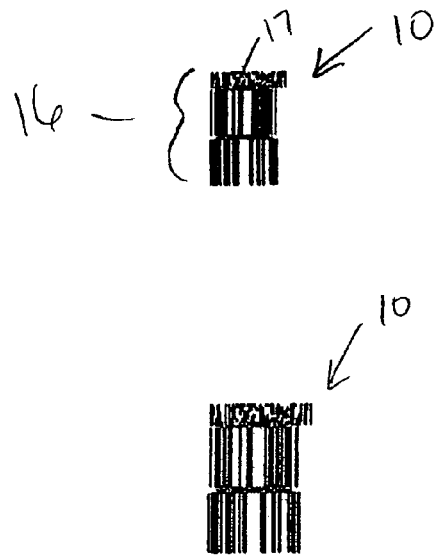
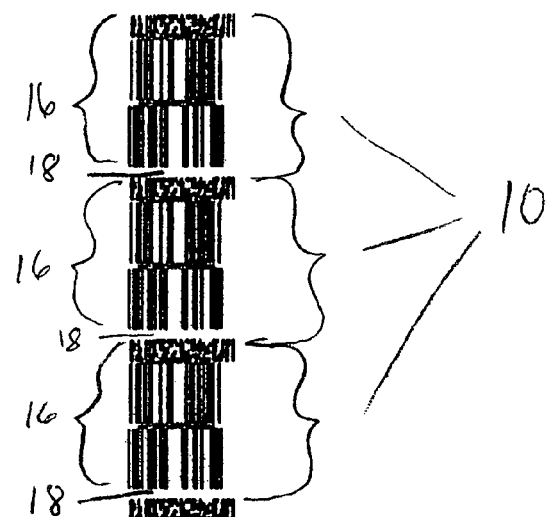
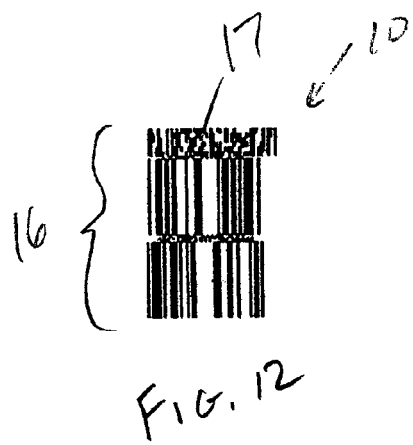
FIG. 12
FIG. 13

SYSTEM AND METHOD FOR PRINTING IMAGES OF MACHINE READABLE SYMBOLS ON A PLURALITY OF SUBSTRATES

CROSS-REFERENCE TO RELATED APPLICATIONS

The present application claims the benefit under 35 U.S.C. § 119(e) from provisional patent application Nos. 60/520,742 and 60/520,821, both filed Nov. 17, 2003, the contents of which are incorporated by reference herein in their entirety.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention relates generally to a system and method for printing images of machine-readable symbols on a printable substrate, and more particularly to printing a plurality of images comprising two-dimensional machine-readable symbols on a plurality of continuous substrates.

SUMMARY OF THE INVENTION

According to an embodiment of the present invention, a method of printing images on a plurality of substrates is provided. The method involves printing a plurality of continuous images of a first symbol comprising at least a two-dimensional machine readable symbol on a plurality of adjacent substrates that are continuously arranged, each substrate having an identical length and comprising at least a printable area, wherein the printable area of each of the plurality of substrates has an identical length. The length of the first symbol is less than the length of the printable area of each of the plurality of substrates. Also, the printable area of each of the plurality of substrates has printed on it at least portions of two or more of the plurality of images that, in combination, comprise at least one complete representation of the two-dimensional machine readable symbol.

In an embodiment of the invention, the first symbol comprises a space excluding the two-dimensional machine readable symbol.

According to another embodiment of the invention, each of the plurality of substrates comprise a space excluding the printable area of the respective substrate.

According to embodiments of the invention, the two-dimensional machine readable symbol may comprise a two-dimensional bar code, a RSS bar code, a RSS Stacked Omni-Directional bar code, and a RSS bar code with a two-dimensional data component.

In another embodiment of the invention, the plurality of substrates are connected and continuous.

According to another embodiment of the invention, a printing apparatus prints the plurality of images on the plurality of substrates, and the printing comprises moving the plurality of substrates relative to the printing apparatus in a direction corresponding to the length of the substrates, wherein the movement of the plurality of substrates is subject to slippage such that degree to which the plurality of substrates is moved cannot be fully controlled.

According to another embodiment of the invention, the printing is performed using a flexographic printing technique.

According to another embodiment of the invention, the printing is performed using a thermal transfer printing technique.

According to another embodiment of the invention, the printing is performed using a web press printing technique.

In another embodiment of the invention, a method of printing images on a plurality of substrates is provided. The method involves printing a plurality of continuous images of a first symbol comprising at least a two-dimensional machine readable symbol on a plurality of adjacent substrates that are continuously arranged, each substrate having an identical length and comprising at least a printable area, wherein the printable area of each of the plurality of substrates has an identical length, wherein the length of the first symbol is less than the length of the printable area of each of the plurality of substrates, wherein the printable area of each of the plurality of substrates has printed on it at least portions of two or more of the plurality of images that, in combination, comprise at least one complete representation of the two-dimensional machine readable symbol, and wherein the printable area of each of the plurality of substrates comprises at least one indentation along an edge of the printable area of the respective substrate for facilitating the conforming of the printable area of the respective substrate to a curved surface without obscuring the readability of the at least one complete representation of the two-dimensional symbol on the printable area of the respective substrate.

In another embodiment of the invention, a method of printing images on a plurality of substrates is provided. The method involves printing a plurality of continuous images of a first symbol comprising at least a two-dimensional machine readable symbol on a plurality of continuous portions of a substrate, each substrate portion having an identical length and comprising at least a printable area, wherein the printable area of each of the plurality of substrate portions has an identical length. The length of the first symbol is less than the length of the printable area of each of the plurality of substrate portions. The printable area of each of the plurality of substrate portions has printed on it at least portions of two or more of the plurality of images that, in combination, comprise at least one complete representation of the two-dimensional machine readable symbol.

In another embodiment of the invention, a method of printing images on a plurality of substrates is provided. The method involves printing a plurality of continuous images of a first symbol comprising at least a two-dimensional machine readable symbol on a plurality of continuous portions of a substrate, each substrate portion having an identical length and comprising at least a printable area, wherein the printable area of each of the plurality of substrate portions has an identical length. The length of the first symbol is less than the length of the printable area of each of the plurality of substrate portions. The printable area of each of the plurality of substrate portions has printed on it at least portions of two or more of the plurality of images that, in combination, comprise at least one complete representation of the two-dimensional machine readable symbol. The printable area of each of the plurality of substrate portions has printed on it at least portions of two or more of the plurality of images that, in combination, comprise at least one complete representation of the two-dimensional machine readable symbol. The printable area of each of the plurality of substrate portions comprises at least one indentation along an edge of the printable area of the respective substrate portion for facilitating the conforming of the printable area of the respective substrate portion to a curved surface without obscuring the readability of the at least one complete representation of the two-dimensional symbol on the printable area of the respective substrate portion.

According to another embodiment of the invention, a set of substrates is provided. The set of substrates comprises a plurality of continuous substrates of identical length on which are printed a plurality of continuous images of a first symbol that comprises at least a two-dimensional machine readable symbol, wherein each substrate has an identical length and comprises a printable area, wherein the printable area of each of the plurality of substrates has an identical length. The length of the first symbol is less than the length of the printable area of each of the plurality of substrates. The printable area of each of the plurality of substrates has printed on it at least portions of two or more of the plurality of images that, in combination, form at least one complete representation of the two-dimensional machine readable symbol.

According to another embodiment of the invention, a set of substrates is provided. The set of substrates comprises a plurality of continuous substrates of identical length on which are printed a plurality of continuous images of a first symbol that comprises at least a two-dimensional machine readable symbol, wherein each substrate has an identical length and comprises a printable area, wherein the printable area of each of the plurality of substrates has an identical length. The length of the first symbol is less than the length of the printable area of each of the plurality of substrates. The printable area of each of the plurality of substrates has printed on it at least portions of two or more of the plurality of images that, in combination, form at least one complete representation of the two-dimensional machine readable symbol. The printable area of each of the plurality of substrates comprises at least one indentation along an edge of the printable area of the respective substrate for facilitating the conforming of the printable area of the respective substrate to a curved surface without obscuring the readability of the at least one complete representation of the two-dimensional symbol on the printable area of the respective substrate.

According to another embodiment of the invention, a substrate is provided. The substrate comprises a plurality of continuous substrate portions of identical length on which are printed a plurality of continuous images of a first symbol that comprises at least a two-dimensional machine readable symbol, wherein each substrate portion has an identical length and comprises a printable area, wherein the printable area of each of the plurality of substrate portions has an identical length. The length of the first symbol is less than the length of the printable area of each of the plurality of substrate portions. The printable area of each of the plurality of substrate portions has printed on it at least portions of two or more of the plurality of images that, in combination, form at least one complete representation of the two-dimensional machine readable symbol.

According to another embodiment of the invention, a substrate is provided. The substrate comprises a plurality of continuous substrate portions of identical length on which are printed a plurality of continuous images of a first symbol that comprises at least a two-dimensional machine readable symbol, wherein each substrate portion has an identical length and comprises a printable area, wherein the printable area of each of the plurality of substrate portions has an identical length. The length of the first symbol is less than the length of the printable area of each of the plurality of substrate portions. The printable area of each of the plurality of substrate portions has printed on it at least portions of two or more of the plurality of images that, in combination, form at least one complete representation of the two-dimensional machine readable symbol. The printable area of each of the plurality of substrate portions comprises at least one indentation along an edge of the printable area of the respective substrate portion for facilitating the conforming of the printable area of the respective substrate portion to a curved surface without obscuring the readability of the at least one complete representation of the two-dimensional symbol on the printable area of the respective substrate portion.

BRIEF DESCRIPTION OF DRAWINGS

The invention is illustrated in the figures of the accompanying drawings, which are meant to be exemplary and not limiting, and in which like references are intended to refer to like or corresponding parts.

FIG. 6 is an illustration of another substrate used in an embodiment of the invention;

FIG. 7 is an illustration of a plurality of images of a symbol comprising a RSS bar code printed on a plurality of substrates according to an embodiment of the invention;

FIG. 8 is an illustration of another substrate used in an embodiment of the invention;

FIG. 9 is an illustration of a plurality of continuous substrates as used in an embodiment of the invention;

FIG. 10 is another illustration of a plurality of continuous substrates as used in an embodiment of the invention;

FIG. 12 illustrates a plurality of symbols of different sizes as used in an embodiment of the invention; and FIG. 13 illustrates a plurality of continuous images of a symbol as used in an embodiment of the invention.

DETAILED DESCRIPTION

According to an embodiment of the present invention, a method is provided for printing images of machine readable symbols on substrates. Printing may include any operation that causes an image to be formed on a substrate, including, for example, high speed, economical printing techniques such as flexographic printing, thermal transfer printing, and web press printing.

The embodiment involves printing images of a symbol that includes at least a two-dimensional machine readable symbol. The symbol that includes at least a two-dimensional machine readable symbol may be referred to as an aggregate symbol.

Figure 1:
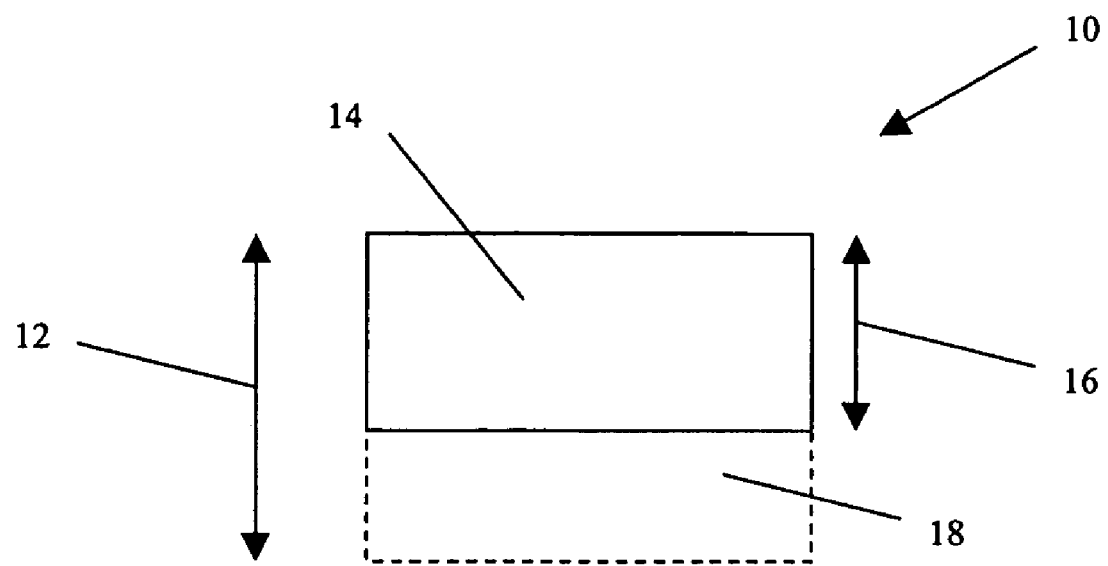
FIG. 1 is an illustration of a symbol used in an embodiment of the invention.

FIG. 1 illustrates and example of the aggregate symbol 10. As stated above, the aggregate symbol 10 includes at least a two-dimensional machine readable symbol, represented in FIG. 1 as block 14. The two-dimensional machine readable symbol may comprise any machine readable symbol that encodes data using two dimensions including, for example, a two-dimensional bar code, a RSS bar code, a RSS Stacked Omni-Directional bar code, and a RSS Stacked Omni-Direction bar code with a two-dimensional data component. The image of the aggregate symbol is printed such that the two-dimensional symbol is machine readable from the image, e.g., using a bar code scanner.

In an embodiment of the invention, the length of the two-dimensional machine readable symbol is the same as the length of the aggregate symbol. In another embodiment of the invention, as shown in FIG. 1, the two-dimensional symbol has a length 16 that is shorter than the length 12 of the aggregate symbol. In such an embodiment, as shown in FIG. 1, the aggregate symbol also includes a space 18 that excludes the two-dimensional machine readable symbol 14. For example, where the two-dimensional machine readable symbol is a bar code, the space may be considered the quiet zone of the bar code.

As mentioned above, the images of the aggregate symbol are printed on substrates. These substrates may comprise any structures on which images may be formed including, for example, adhesive labels.

Figure 2:
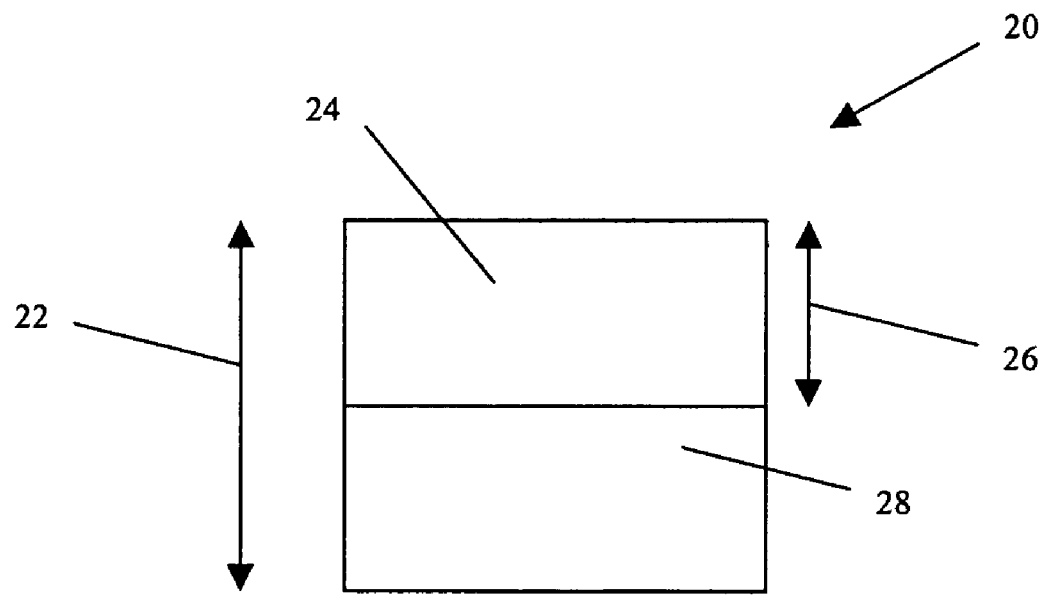
FIG. 2 is an illustration of a substrate used in an embodiment of the invention.

FIG. 2 shows an example of a substrate that may be used in the invention. As shown in FIG. 2, the substrate 20 includes a printable area 24. The printable area may comprise any portion of the substrate on which printing is expected to occur. For example, where the substrate is an adhesive label, the printable area may comprise the portion of the label on which images are expected to be printed which is then removed and adhered to an object.

In an embodiment of the invention, the length of the printable area is the same as the length of the substrate. In another embodiment of the invention, as shown in FIG. 2, printable area 24 has a length 26 that is shorter than the length 22 of the substrate. In such an embodiment, as shown in FIG. 2, the substrate also includes a space 28 that excludes the printable area. For example, where the substrate is an adhesive label and the printable area is a die cut portion of the label, the space 28 may be the area outside the die cut portion which is not intended to be printed on and is not intended to be removed.

According to an embodiment of the invention, a plurality of continuous images of the aggregate symbol are printed on a plurality of adjacent substrates arranged sequentially. The plurality of sequentially arranged and adjacent substrates may take a variety of forms. For example, the plurality of substrates may be unconnected and placed one after another in a sequence. In another example, the plurality of substrates may be connected in a continuous manner, e.g., a roll of adhesive labels.

In an embodiment of the invention, the plurality of substrates are configured so that each substrate has an identical length and the printable area of each substrate has an identical length. The aggregate symbol may then be configured so that its length is less than the length of the printable area of each substrate.

Configuring the aggregate symbol in this manner has advantages. For example, printing a plurality of continuous images of the aggregate symbol on a plurality of adjacent substrates that are sequentially arranged results in the printable area of each substrate having printed on it portions of images that, in combination, include at least one complete representation of the two-dimensional machine readable symbol. In other words, the printable area of each substrate has printed on it all the parts of the two-dimensional machine readable symbol.

Figure 3:
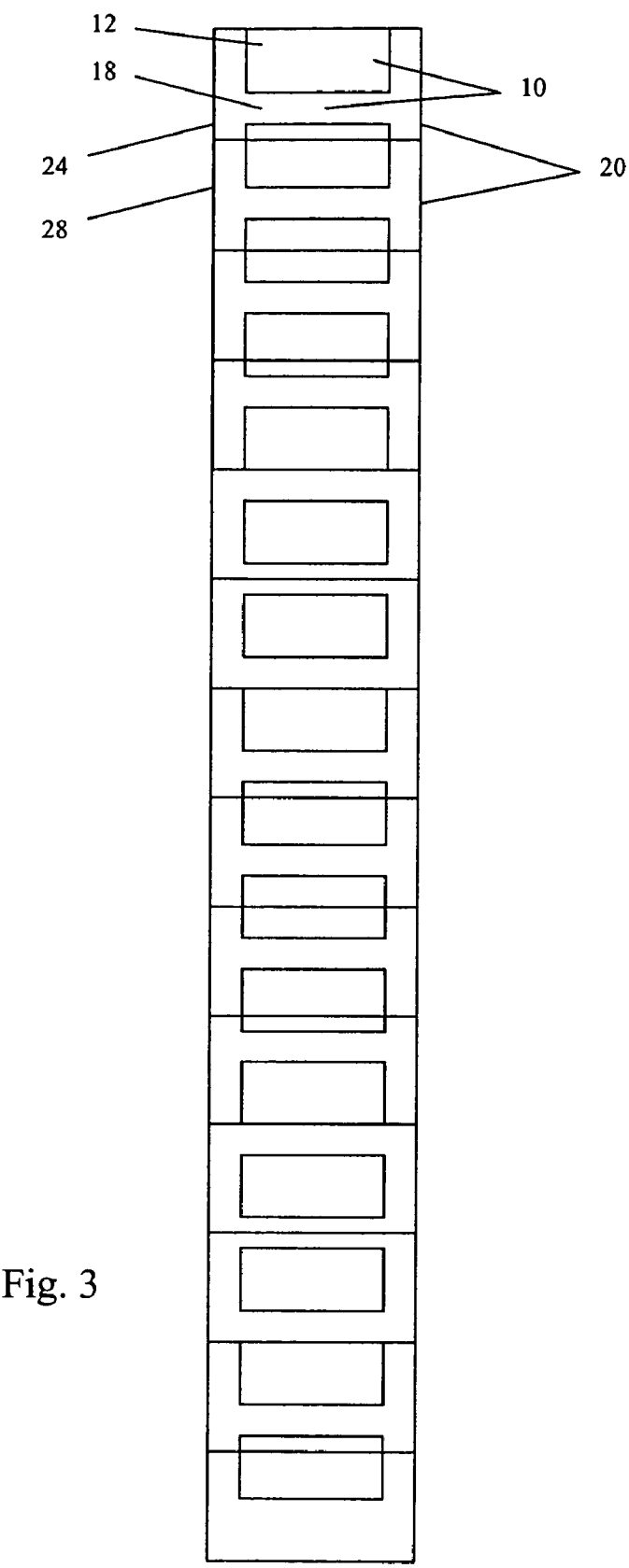
FIG. 3 is an illustration of a plurality of images of a symbol printed on a plurality of substrates according to an embodiment of the invention.
Figure 4:
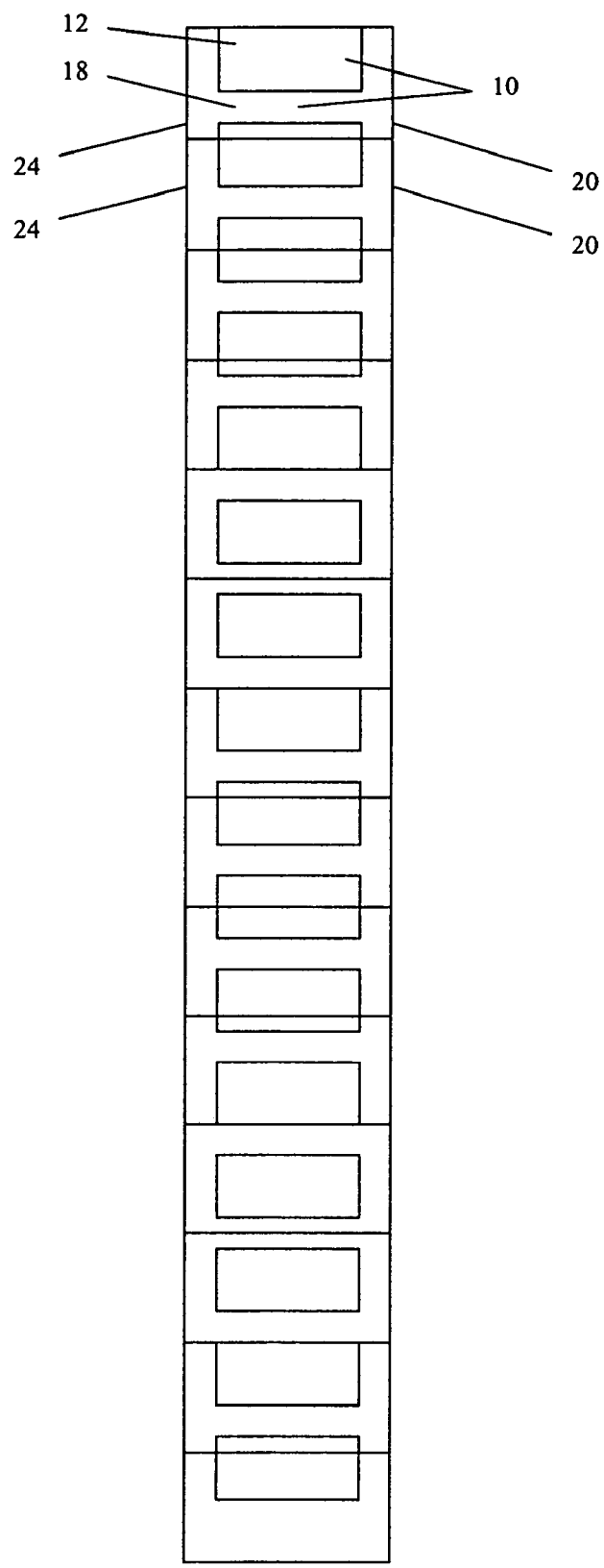
FIG. 4 is another illustration of a plurality of images of a symbol printed on a plurality of substrates according to an embodiment of the invention.
Figure 5:
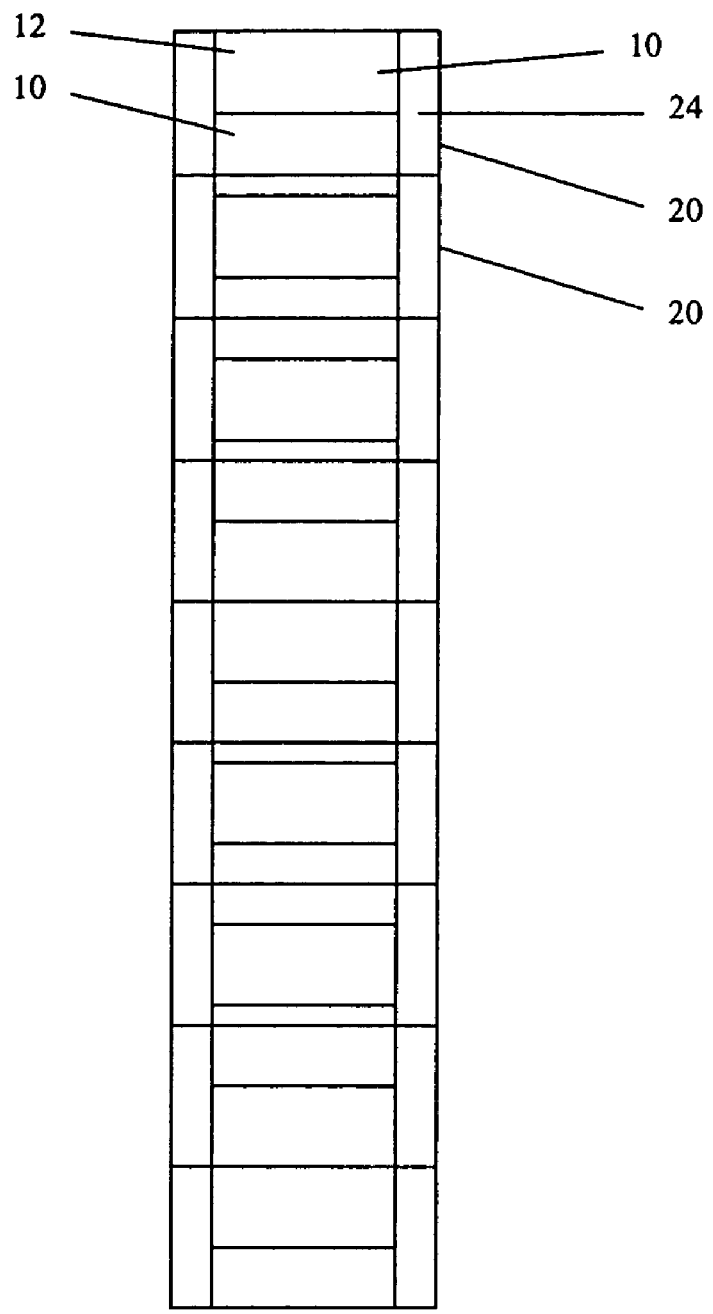
FIG. 5 is another illustration of a plurality of images of a symbol printed on a plurality of substrates according to an embodiment of the invention.

FIGS. 3 to 5 show examples of substrates on which continuous images of an aggregate symbol have been printed according to the techniques described above. In the example of FIG. 3, the aggregate symbol 10 includes a two-dimensional machine readable symbol 12 and a space 18 that excludes the two-dimensional machine readable symbol. Each of the substrates 20 shown in FIG. 3 include a printable area 24 and a space 28 that excludes the printable area.

In FIG. 4, the aggregate symbol 10 includes a two-dimensional machine readable symbol 12 and a space 18 that excludes the two-dimensional machine readable symbol. Each of the substrates 20 shown in FIG. 4 include a printable area 24 having the same length as the substrate. Thus, the substrates shown in FIG. 4 do not include spaces that exclude the printable area.

In FIG. 5, the aggregate symbol 10 includes a two-dimensional machine readable symbol 12 that has the same length as the aggregate symbol. Thus, the aggregate symbol shown in FIG. 5 does not include a space that excludes the two-dimensional machine readable symbol. Each of the substrates 20 shown in FIG. 5 include a printable area 24 having the same length as the substrate. Thus, the substrates shown in FIG. 5 do not include spaces that exclude the printable area.

FIG. 6 shows an example of another substrate that may be used in the invention. In FIG. 6, the substrate 20 comprises a printable area 24 that includes information 21 that is preprinted, e.g., printed at any time prior to the printing of images of an aggregate symbol. For example, where the substrate is an adhesive label for use with a product, the printable area may have preprinted on it information corresponding to the product on which it is to be placed. In the example of FIG. 6, the labels are to be used with produce and the printable area has preprinted on it includes a company logo, a Price Look Up (PLU) number, and a common description ("Granny Smith Apple").

As shown in FIG. 6, the substrate 20 may also include one or more indentations 23 along the edge of the printable area 24. The indentations 23 allow the printable area of the substrate to be placed on a curved surface, e.g., small fruit such as plums or apricots, so as to conform to the curved surface without crimping or fluting that may spoil the readability of the image of the two-dimensional machine readable symbol printed on the printable area.

FIG. 7 shows a plurality of the substrates of FIG. 6 on which are printed a plurality of continuous images of an aggregate symbol according to the techniques described above. In FIG. 7, the aggregate symbol comprises a RSS Stacked Omni-Directional bar code and no space excluding the bar code.

The type of two-dimensional machine readable symbol included in the aggregate symbol may be chosen based on the operating environment in which the substrates will be used. For example, in retail market where produce is sold, RSS Stacked Omni-Directional bar codes may be chosen so as to be compatible with the scanners used in those markets. The type of two-dimensional machine readable symbol may also be chosen based on a shape and size that will provide a large angle of scan, e.g., 90 degrees.

FIG. 8 shows an example of another substrate that may be used in the invention. In FIG. 8, the substrate 20 comprises a printable area 24 with preprinted information and indentations 23 along the edges of the printable area.

FIGS. 9 and 10 show examples of other substrates that may be used in the invention. In FIG. 9, the plurality of substrates 20 are continuously attached and perforations 25 enable individual substrates to be removed. In FIG. 10, the plurality of substrates 20 are also continuously attached and perforated. In FIG. 10, each substrate also has indentations 23 along the edge of the printable area of the substrate. In the example of FIG. 10, the indentations 23 take the form of die-cut slits.

Figure 11:
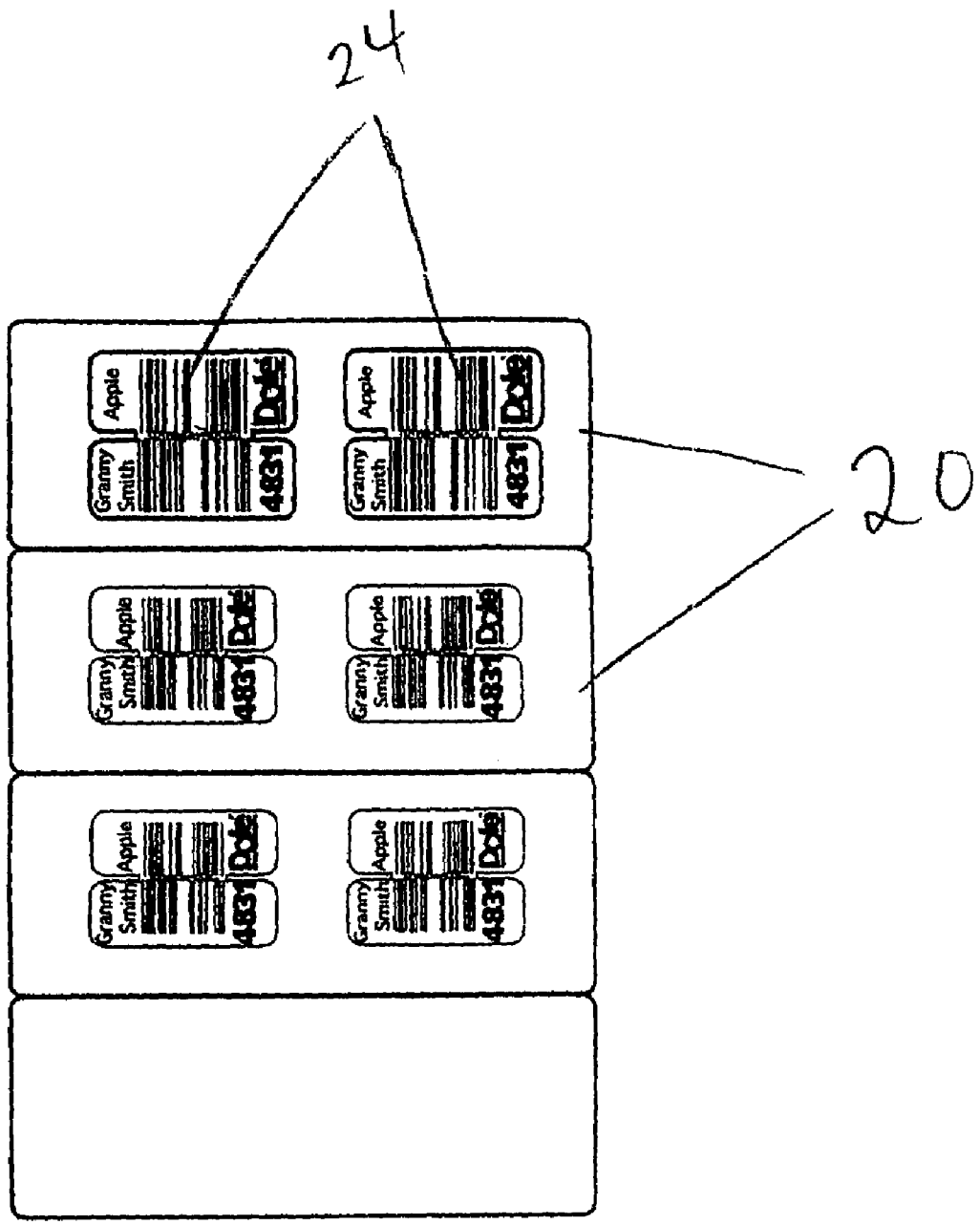
FIG. 11 is another illustration of a plurality of substrates as used in an embodiment of the invention.

FIG. 11 shows an example of another substrate that may be used in the invention. In FIG. 11, the plurality of substrates 20 are continuously attached. Each substrate 20 comprises multiple printable areas 24 that are die-cut.

FIG. 12 shows examples of aggregate symbols of different sizes with bar codes of various x-dimensions. Each of the aggregate symbols 10 shown in FIG. 12 comprises a two-dimensional machine readable symbol 16 that is a RSS Stacked Omni-Direction bar code with a two-dimensional data component 17.

FIG. 13 shows a plurality of continuous images of an aggregate symbol 10 that comprises a two-dimensional machine readable symbol 16 and a space 18 that excludes the two-dimensional machine readable symbol. The two-dimensional machine readable symbol 16 shown in FIG. 13 includes a RSS Stacked Omni-Direction bar code with a two-dimensional data component 17.

According to another embodiment of the present invention, a plurality of continuous images of an aggregate symbol are printed on a single substrate, e.g., a strip of adhesive tape. The substrate may comprise a plurality of portions of identical length with each portion comprising a printable area where the printable areas of each substrate portion is identical in length. The aggregate symbol may then be configured so that its length is less than the length of the printable area of each substrate portion.

One advantageous result of the substrate created according to this process is that the printable area of each substrate portion will have printed on it portions of images that, in combination, comprise at least one complete representation of the two-dimensional machine readable symbol of the aggregate symbol.

This same result is achieved if the substrate created according to this process is broken up into pieces of a length greater than the length of the aggregate symbol. Each such piece will then have printed on it portions of images that, in combination, comprise at least one complete representation of the two-dimensional machine readable symbol of the aggregate symbol.

The substrate created according to the process above may be broken up into such pieces in various ways. For example, where the substrate is a roll of adhesive tape, the roll of tape may be mounted in a tape dispenser may indicate to a user the minimum length of a piece of the tape needed to achieve the above effect.

The embodiments of the invention as described above have various advantages. For example, in printing techniques, such as flexographic printing, thermal transfer printing, and web press printing, where the media being printed upon is moved relative to a printing apparatus and this movement cannot be fully controlled, e.g., due to slippage, so that the placement of the image being printed onto the media is imprecise, the embodiments of the invention ensure that the printable area of each piece of media includes a complete representation of the information being printed, e.g., a two-dimensional machine readable symbol.

Thus, the embodiments of the invention may be used to high-speed and economical printing processes, such as flexographic printing, thermal transfer printing, and web press printing, to print large numbers of substrates, e.g., adhesive labels, each of which includes a complete representation of a two-dimensional machine readable symbol. For example, in the retail market, the embodiments of the invention described above could be used to print large numbers of adhesive labels to be applied to small round items, such as fruit and other produce, where each label includes a complete representation of a two-dimensional machine readable symbol that encodes at least a PLU number.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

What is claimed is:

1. A method of printing images on a plurality of substrates using a printing apparatus, the method comprising:
    printing a plurality of continuous images of a first symbol comprising at least a two-dimensional machine readable symbol on a plurality of adjacent substrates that are continuously arranged, each substrate having an identical length and comprising at least a printable area,
    wherein the printable area of each of the plurality of substrates has an identical length;
    wherein the length of the first symbol is less than the length of the printable area of each of the plurality of substrates;
    wherein the printable area of each of the plurality of substrates has printed on it at least portions of two or more of the plurality of images that, in combination, comprise at least one complete representation of the two-dimensional machine readable symbol, and
    wherein the printing comprises moving the plurality of substrates relative to the printing apparatus in a direction corresponding to the length of the substrates, wherein the movement of the plurality of substrates is subject to slippage such that a degree to which the plurality of substrates is moved cannot be fully controlled.

2. The method of claim 1, wherein the first symbol comprises a space excluding the two-dimensional machine readable symbol.

3. The method of claim 1, wherein each of the plurality of substrates comprise a space excluding the printable area of the respective substrate.

4. The method of claim 1, wherein the two-dimensional machine readable symbol comprises a two-dimensional bar code.

5. The method of claim 4, wherein the two-dimensional bar code comprises a RSS bar code.

6. The method of claim 5, wherein the RSS bar code comprises a RSS Stacked Omni-Directional bar code.

7. The method of claim 5, wherein the RSS bar code comprises a two-dimensional data component.

8. The method of claim 1, wherein the plurality of substrates are connected and continuous.

9. The method of claim 1, wherein the printing is performed using a flexographic printing technique.

10. The method of claim 1, wherein the printing is performed using a thermal transfer printing technique.

11. The method of claim 1, wherein the printing is performed using a web press printing technique.

12. A method of printing images on a plurality of substrates, comprising:
 printing a plurality of continuous images of a first symbol comprising at least a two-dimensional machine readable symbol on a plurality of adjacent substrates that are continuously arranged, each substrate having an identical length and comprising at least a printable area,
 wherein the printable area of each of the plurality of substrates has an identical length;
 wherein the length of the first symbol is less than the length of the printable area of each of the plurality of substrates;
 wherein the printable area of each of the plurality of substrates has printed on it at least portions of two or more of the plurality of images that, in combination, comprise at least one complete representation of the two-dimensional machine readable symbol; and
 wherein the printable area of each of the plurality of substrates comprises at least one indentation along an edge of the printable area of the respective substrate for facilitating the conforming of the printable area of the respective substrate to a curved surface without obscuring the readability of the at least one complete representation of the two-dimensional symbol on the printable area of the respective substrate.

13. The method of claim 12, wherein the first symbol comprises a space excluding the two-dimensional machine readable symbol.

14. The method of claim 12, wherein each of the plurality of substrates comprise a space excluding the printable area of the respective substrate.

15. The method of claim 12, wherein the two-dimensional machine readable symbol comprises a two-dimensional bar code.

16. The method of claim 12, wherein the two-dimensional bar code comprises a RSS bar code.

17. The method of claim 16, wherein the RSS bar code comprises a RSS Stacked Omni-Directional bar code.

18. The method of claim 16, wherein the RSS bar code comprises a two-dimensional data component.

19. A method of printing images on a substrate, comprising:
 printing a plurality of continuous images of a first symbol comprising at least a two-dimensional machine readable symbol on a plurality of continuous portions of a substrate, each substrate portion having an identical length and comprising at least a printable area,
 wherein the printable area of each of the plurality of substrate portions has an identical length;
 wherein the length of the first symbol is less than the length of the printable area of each of the plurality of substrate portions;
 wherein the printable area of each of the plurality of substrate portions has printed on it at least portions of two or more of the plurality of images that, in combination, comprise at least one complete representation of the two-dimensional machine readable symbol; and
 wherein the printable area of each of the plurality of substrate portions comprises at least one indentation along an edge of the printable area of the respective substrate portion for facilitating the conforming of the printable area of the respective substrate portion to a curved surface without obscuring the readability of the at least one complete representation of the two-dimensional symbol on the printable area of the respective substrate portion.

20. The method of claim 19, wherein the first symbol comprises a space excluding the two-dimensional machine readable symbol.

21. The method of claim 19, wherein each of the plurality of substrates comprise a space excluding the printable area of the respective substrate.

22. The method of claim 19, wherein the two-dimensional machine readable symbol comprises a two-dimensional bar code.

23. The method of claim 19, wherein the two-dimensional bar code comprises a RSS bar code.

24. The method of claim 23, wherein the RSS bar code comprises a RSS Stacked Omni-Directional bar code.

25. The method of claim 23, wherein the RSS bar code comprises a two-dimensional data component.

26. A set of substrates, comprising: a plurality of continuous substrates of identical length on which are printed a plurality of continuous images of a first symbol that comprises at least a two-dimensional machine readable symbol wherein each substrate has an identical length and comprises a printable area, wherein the printable area of each of the plurality of substrates has an identical length; wherein the length of the first symbol is less than the length of the printable area of each of the plurality of substrates; wherein the printable area of each of the plurality of substrates has printed on it at least portions of two or more of the plurality of images that, in combination, form at least one complete representation of the two-dimensional machine readable symbol; and wherein the printable area of each of the plurality of substrates comprises at least one indentation along an edge of the printable area of the respective substrate for facilitating the conforming of the printable area of the respective substrate to a curved surface without obscuring the readability of the at least one complete representation of the two-dimensional symbol on the printable area of the respective substrate.

27. A substrate, comprising:
 a plurality of continuous substrate portions of identical length on which are printed a plurality of continuous images of a first symbol that comprises at least a two-dimensional machine readable symbol,
 wherein each substrate portion has an identical length and comprises a printable area,
 wherein the printable area of each of the plurality of substrate portions has an identical length; wherein the length of the first symbol is less than the length of the printable area of each of the plurality of substrate portions; wherein the printable area of each of the plurality of substrate portions has printed on it at least portions of two or more of the plurality of images that, in combination, form at least one complete representation of the two-dimensional machine readable symbol; and
 wherein the printable area of each of the plurality of substrate portions comprises at least one indentation along an edge of the printable area of the respective substrate portion for facilitating the conforming of the printable area of the respective substrate portion to a curved surface without obscuring the readability of the at least one complete representation of the two-dimensional symbol on the printable area of the respective substrate portion.

* * * * *